Oct. 30, 1962 — P. HAENSCH — 3,061,320
AXIAL SEAL FOR ROTARY SHAFTS OR THE LIKE
Filed Sept. 29, 1958 — 3 Sheets-Sheet 1
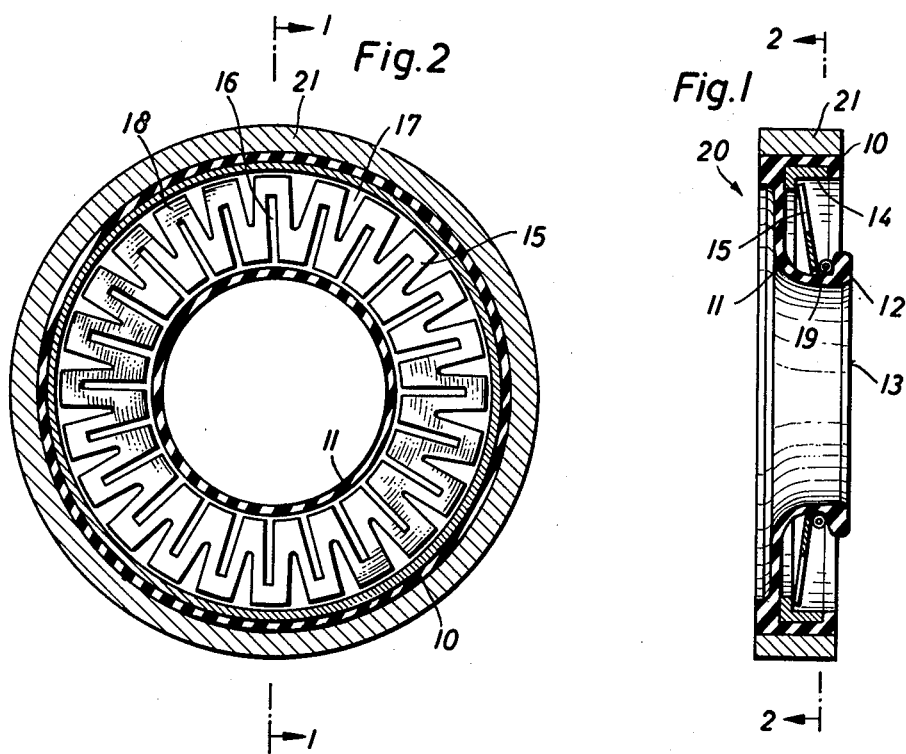
INVENTOR
Paul Haensch
BY
Lowry & Rinehart
ATTYS.

Oct. 30, 1962  P. HAENSCH  3,061,320
AXIAL SEAL FOR ROTARY SHAFTS OR THE LIKE
Filed Sept. 29, 1958  3 Sheets-Sheet 2
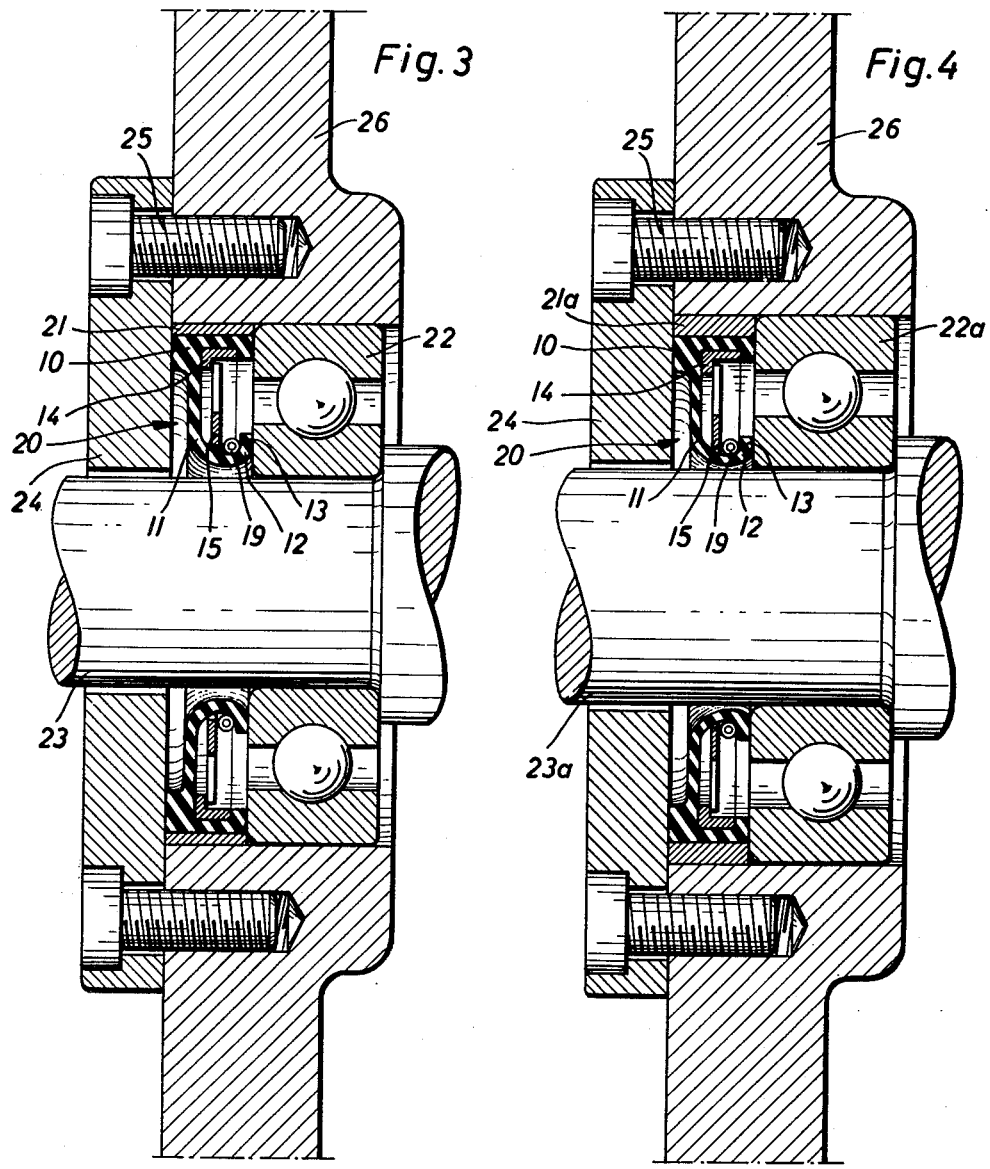
INVENTOR
Paul Haensch
BY
Lowry & Rinehart
ATTYS.

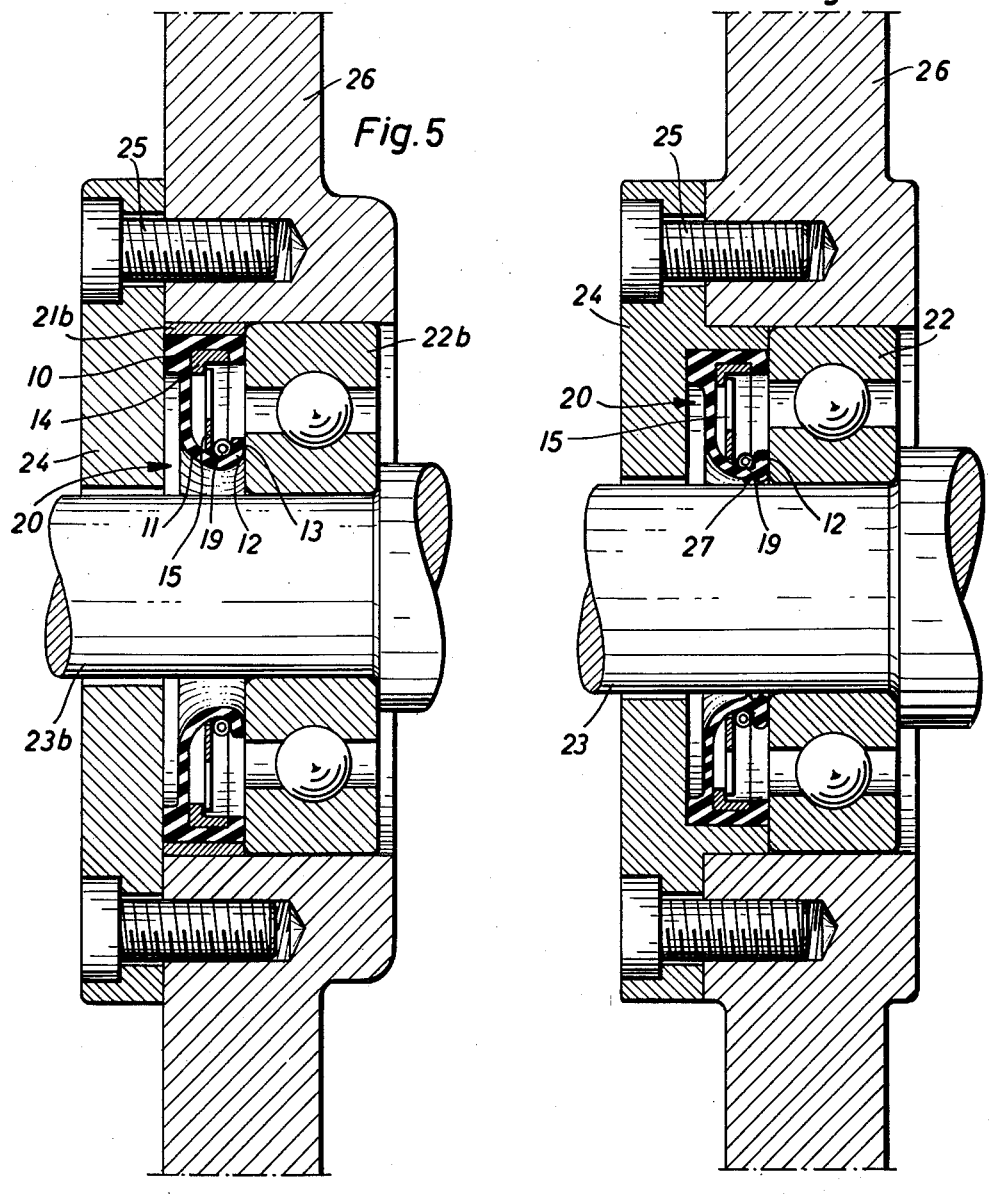

United States Patent Office 3,061,320
Patented Oct. 30, 1962

3,061,320
AXIAL SEAL FOR ROTARY SHAFTS OR THE LIKE
Paul Haensch, Koln-Kalk, Germany, assignor, by mesne assignments, to Aeroquip G.m.b.H., Hannoversch-Munden, Germany, a German firm
Filed Sept. 29, 1958, Ser. No. 764,194
3 Claims. (Cl. 277—142)

The invention relates to an axial seal for rotary shafts or the like, and especially to a sealing ring ready for installation.

In known devices of this character, the lips of the sealing body contacting a radially extending surface are subjected to the action of a helical spring. The use of helical springs for this purpose requires considerable space for accommodation of the necessary number of windings. To secure a soft surface pressure, a relatively high number of windings of the helical spring is necessary whereby the sealing ring becomes very cumbersome. Besides, a helical spring effects a surface pressure unequally distributed over the circumference and this effect is very unfavorable especially in an axial seal.

The object of the invention is to provide an axial seal for rotary shafts or the like with the use of a spring acting upon the sealing member in axial direction. The essential feature requires that the spring is formed as a disc spring which extends in radial direction as a flat disc in a radially directed, angularly bent collar within the open section of the angle from the bottom of the collar to the sealing member displaceable in axial direction. The outer periphery of the disc spring rests upon the bottom of the collar or upon an extension thereof while the part directed towards the shaft acts in axial direction upon the sealing lip and in the rest position of the sealing ring advance the sealings lip somewhat in axial directtion beyond the lateral surface of the collar casing. The disc spring is provided with small slots equally spaced on the inner and outer periphery thereof so that a resilient disc is obtained in which each tab formed by the slots is subjected to a uniform annular tension.

The development according to the invention has many advantages. There is obtained a uniform surface pressure over the whole extent of the radially directed sealing surface. Each individual tab of the continuous disc extends as a flat part from the outer to the inner peripheral edge, the characteristic curve of resiliency of the disc spring being substantially flat so that a soft action of the spring is obtained. The uniformity of the surface pressure and the soft action of the spring considerably diminish the danger of heating and wearing of the sealing material. A further essential advantage consists therein that the space occupied by the whole axially effective sealing ring is very small. The sealing ring together with its casing may be made very narrow.

According to a further feature of the invention, the tightening effect of the spring may be increased by the insertion of an intermediate ring between the inner periphery of the disc spring and the axially effective sealing member. When providing the axially effective sealing member with an additional sealing surface contacting the circumference of the shaft, the intermediate ring consists advantageously of a garter spring which in a manner known per se may press the additional sealing surface against the circumference of the shaft.

The axial seal according to the invention is further provided at the outer circumference with a removable spacing ring of rectangular cross-section. By the co-operation of the axial seal with a removable spacing ring at the outer circumference of the axial seal is obtained an effective seal which may readily be installed. The spacing ring serves on the one hand for fixing the outer bearing ring of ball or roller bearings to be sealed and on the other hand at the inner circumference simultaneously as fitting and adhering surface for the axial seal according to the invention. The spacing ring takes up the axially acting forces necessary for fixing the ball bearing ring or the like and thereby relieves the adhering member of the axial seal therefrom so that the sealing ring is free from the influence of transverse forces. The spacing ring limits the possibility of stressing of the sealing lip movable in axial directon so that any overstressing is prevented. By the spacing ring is further given the possibility to use the same dimension of an axial sealing ring ready to be installed for sealing of various sizes of ball or roller bearings. One size of a sealing ring with a certain height of the flat disc spring is suitably associated with spacing rings of different height or thickness. Spacing rings with different cross-sections may readily be stored whereby the number of sizes of sealing rings to be stored is considerably diminished. It is unimportant for the axial sealing at the ring of a ball bearing or the like whether the sealing is effected at the lower or upper front surface of the same ring. In this manner it is possible that about 20 sizes of sealing rings will be sufficient for shaft diameters between 6 and 100 mm. The existing differences will be compensated by spacing rings of different thickness at the circumference of the sealing rings. The manufacture of the spacing rings is very simple. They may be made by cutting off predetermined lengths from a tube of suitable wall thickness. The adhering member may be additionally provided with an inner or outer sheet metal reinforcement known per se which cannot take charge of the function of the spacing ring provided in the combination according to the invention.

In the drawings are illustrated by way of example several embodiments of the object of the invention.

FIG. 1 is a vertical cross-sectional view taken on line 1—1 of FIG. 2, showing the axially effective sealing ring together with the spacing ring, FIG. 2 is a cross-sectional view on line 2—2 of FIG. 1 showing the disc spring for the seal, and FIGS. 3 to 6 show in vertical cross-section different embodiments of the invention employing the sealing ring of FIGS. 1 and 2.

The sealing ring, designated in general by the numeral 20, consists of a body member including an outer ring portion or member 10 which simultaneously serves as adhering member, of a tubular sleeve or collar 11 and of a sealing lip or member 12 which seals in axial direction by means of the sealing surface 13. A cage member or abutment ring 14 which is preferably made from metal serves for reinforcement of the adhering member 10. The sleeve 11 extends substantially in radial direction and is made very long so that the axially effective sealing member 12 may have a large axial displacement. The sealing member 12 is subjected to the action of a substantially frustro-conical disc spring 15 which substantially consists of an annular disc extending in radial direction. The disc is closed in itself and provided with slots 16 and 17 which are arranged in reverse order at the inner and outer peripheral edge. By this arrangement, stressing of one spring tab 18 acts upon the whole periphery of the disc. Due to this arrangement of the disc spring 15, the whole height of the annular disc acts as a lever arm. By this construction there is obtained a soft action of the spring with a large spring deflection in axial direction. In the rest position, the disc is slightly curved. When installed, the flat spring disc effects the spring action. Between the inner peripheral edge of the disc spring 15 and the sealing member 12 may be provided an intermediate ring 19 which suitably is formed as a coil or garter spring. In this manner, the thin collar 11 is at the same time held tight in radial direction. The sealing ring 20 is provided at the outer circumference with a separate spacing ring 21 which protects the sealing ring against compression in axial direction and which dependent on the conditions of installation may have different thickness in radial direction.

In the embodiment of FIG. 3, sealing by the axial seal 20 is effected by means of surface 13 of the axially movable sealing member 12 which contacts the inner ring of ball bearing 22. Free play is provided between the sealing member 12 and the shaft 23. The spacing ring 21 on the one hand transmits the force exerted by the cover plate 24 on the outer ring of the ball bearing 22 for fixing the same in axial direction. The cover plate 24 is fixed by means of bolts 25 to the casing 26. The spacing ring 21 also serves as a fitting for the adhering member 10 of the sealing ring 20. Since it is merely necessary that sealing is effected at the radial surface or in an annular ring at the side of the inner ring of the ball bearing 22 without requiring a certain height of the sealing member 12, sealing rings may be used which may vary within a certain range regarding the outer diameter and the inner diameter given by the sealing member. For certain nominal sizes of the inner diameter will be provided normal sizes of the sealing rings 20. The space between the outer circumference of the sealing ring 20 and the bore of casing 26 which receives the ball bearing will be compensated by a spacing ring 21 of suitable thickness.

It may be seen from the embodiments illustrated in FIGS. 3, 4 and 5 that one and the same normal size of the sealing ring 20 may be used for different shaft diameters with different bores of the casing for receiving the ball bearing or the like by varying the thickness of the spacing ring 21. In the embodiment of FIG. 4, the same axial sealing ring may be used for a larger shaft diameter and a larger bore of the casing. For this reason, the spacing ring 21a has a different thickness and the sealing member 12 is sealing nearer the lower zone of the inner ring of ball bearing 22a. In the embodiment of FIG. 5, the diameter of shaft 23b is considerably smaller as well as the bore of the casing is made smaller for a different size of ball bearing 22b. When the normal sizes of sealing rings 20 with the spacing rings 21, 21a, 21b will be suitably graded, a relatively small number of sizes will be sufficient for a large range of shaft diameters.

The axial seal according to the invention for rotary shafts offers the advantage that no sealing about the rotary shaft is necessary. For this reason, soft shafts may be used as usual in machine-tool construction without compression or scoring of the shaft.

In FIG. 6 is illustrated a further embodiment of a modified sealing ring according to the invention. The sealing member 12 is provided with an additional sealing projection 27 which engages the circumference of shaft 23. This sealing ring is a combined axial and radial seal in which the axially effective member is formed according to the invention. The garter spring 19 effects engagement of the sealing projection 27 with the circumference of the shaft while the flat disc spring 15 sealingly engages the sealing member 12 in axial direction with the inner ring of ball bearing 22. It will be noted that the disc spring 15 has its outer and inner peripheral edges free from those portions functioning to seal. The ring 14 provides a fulcrum for the outer peripheral edge of the disc spring which, in effect, comprises a plurality of radially spaced levers. The inner periphery of the disc spring has a free wiping action in the deformable groove formed on the outer surface of the tubular sleeve 11 to in effect move the sealing lip axially and into sealing relation with the outer surface of a bearing race or the like.

What I claim is:

1. A seal comprising a body member of flexible, molded material including an annular outer ring portion integral with a flexible tubular collar extending from one edge of said ring portion radially inwardly and continuing in an intermediate arcuate portion terminating in a tubular extension extending axially away from said one edge of said ring portion and concentric therewith, an annular abutment ring circumposed within said body member ring portion and including an inwardly extending radial flange adjacent the connection between said ring portion and said tubular collar, said tubular extension including a free sealing lip projecting radially outwardly at the terminal end of said tubular collar and disposed axially beyond a plane passing through the other edge of said annular outer ring portion, said free sealing lip forming with the adjacent portion of said tubular extension a deformable groove opposed to said abutment ring, and a normally frusto-conical disc spring circumposed about said tubular extension, said disc spring including a plurality of slotted portions extending alternately from the inner and outer margins of said disc spring, the outer periphery of said disc spring being in free abutting engagement with the radial flange of said abutment ring and the inner periphery of said disc spring being displaceably disposed in said deformable groove adjacent the outer surface of said tubular extension.

2. A seal as set forth in claim 1 wherein said tubular extension includes at least one annular sealing rib about the inner periphery thereof.

3. A seal as set forth in claim 2 including a garter spring circumposed about said tubular extension within said deformable groove.

References Cited in the file of this patent

UNITED STATES PATENTS

| | | |
|---|---|---|
| 2,049,063 | Hubbard | July 28, 1936 |
| 2,338,873 | Reynolds | Jan. 11, 1944 |
| 2,391,007 | Buckendale | Dec. 18, 1945 |
| 2,481,430 | Koller | Sept. 6, 1949 |
| 2,560,557 | Curtis | July 17, 1951 |
| 2,736,584 | Riesing | Feb. 28, 1956 |